Patented Aug. 5, 1930

1,772,359

UNITED STATES PATENT OFFICE

THOMAS AUSTIN MITCHELL, OF DENVER, COLORADO, ASSIGNOR TO LAFAYETTE M. HUGHES, OF DENVER, COLORADO

METHOD OF TREATING ALUMINUM-OXIDE MINERALS

No Drawing.   Application filed August 30, 1922.   Serial No. 585,311.

My invention relates to the art of treating aluminous materials to recover valuable products therefrom and more particularly to a method of treating crude aluminum oxide which occurs in nature in various forms, such as bauxite, diaspore, gibbsite, corundum and emery, associated with impurities such as silica, ferric oxide, titanic oxide, etc.

The main object of my invention is to provide an efficient and economical method of recovering substantially pure aluminum oxide from common alumina bearing materials, which may be silicious and contain various other impurities, and at the same time produce valuable by-products from the reagents employed. Further objects will be apparent in the following disclosure.

In the treatment of bauxite, it has been proposed to calcine it with calcium carbonate to form calcium aluminate which may subsequently be converted to a soluble sodium aluminate by leaching with a sodium carbonate solution. It, however, is found that the calcination of bauxite with calcium carbonate results in a hard vitreous mass which is not easily ground or leached, this condition being presumably brought about by the presence of silica which forms calcium silicates and serves as a bond or a flux to make a solid mass of the material.

As a result of my experimentation, I have found that an alkaline earth metal aluminate may be formed from crude aluminum oxide, such as occurs in clays and other materials and which may contain a large amount of silica as well as other impurities, by calcining it with a carbonate of such metal, and that the calcine will be found in an easily leached condition, thereby resulting in a high yield, if a small amount of an alkaline earth metal sulfate, such as calcium sulfate, is formed during the calcination and remains interspersed throughout the aluminate. In a subsequent leaching operation, preferably with an alkali metal carbonate solution, such as sodium carbonate, the calcium sulfate will be transposed to calcium carbonate and soluble sodium sulfate formed throughout the calcine, thereby forming pores or channels which permit the carbonate to attack the mass readily. The presence of the alkaline earth metal sulfate appears to prevent the formation of a vitreous mass, such as a calcium aluminum silicate, and keeps the product light and easily grindable. The other elements of the alkaline earth group, barium, strontium and magnesium, may be employed in place of calcium, it being understood that the subsequent treatment after calcination will depend upon the nature of the original ingredients to be calcined. For example, if soluble magnesium sulfate is formed in the calcine, it will preferably be washed out with water before leaching with the sodium carbonate solution, thereby eliminating the formation of large amounts of sodium sulfate. Barium sulfate on the other hand is insoluble in the sodium carbonate solution and remains with the residue during leaching, whereas calcium sulfate is transposed to a carbonate during this step.

I have also found that by taking advantage of my discovery of the function of such interspersed material, the furnacing operation may be utilized to form desired by-products and to convert cheap minerals or such waste materials as ferrous sulfate and crude sulfuric acid into valuable commercial salts, and to this end I employ such reagents and so carry on my process as to form the desired alkaline earth metal sulfate interspersed throughout the calcine and thereafter transpose the undesired ingredients to more useful materials or recover the original salts formed during calcination, as seems best. By employing a carbonate instead of other compounds of alkaline earth metal to form the aluminate, I insure an evolution of carbon dioxide during the reaction which aids in keeping the calcine in an easily leachable condition and furnishes a gas for later use in the recovery of sodium carbonate and the precipitation of aluminum hydroxide, thereby forming a cyclic process.

In accordance with my invention I propose to calcine bauxite, diaspore and similar sulfate free, alumina bearing minerals in the presence of an alkaline earth material and a chemical compound containing a non-alkali base and the sulfate radical which is capable of reacting with the alkaline earth material to form a sulfate, and the ingredients are so proportioned as to form a monoalkaline earth metal aluminate with all of the alumina present and a basic alkaline earth metal sulfate interspersed throughout the mixture. If metal salts are desired, I may calcine the oxide with a sulfate and a compound containing a metal of a desired end product in the presence of the alkaline earth metal carbonate.

Of the various compounds containing the sulfate radical which are available for my purpose, I preferably utilize crude sulfuric acid or a sulfate or bisulfate of a metal of the iron and zinc groups. The alkaline earth material, which is preferably a carbonate of calcium, barium, strontium or magnesium, taken either separately or in combination, is utilized preferably in a molecularly equivalent amount to combine with all of the alumina present to form a mono-alkaline earth metal aluminate therewith and to combine with all of the silica, iron oxide, titanium oxide, and other associated reactive impurities to form alkaline earth metal silicates and other compounds therewith. An additional amount of alkaline earth metal carbonate or other suitable compound is employed to combine with all of the added sulfate radical to form the interspersed alkaline earth metal sulfate and with any reactive metal, such as iron or aluminum, of a metal sulfate, if the latter is used. The nature of the added ingredients will be predetermined in accordance with the soluble or insoluble end products which may be desired. By including a suitable metal salt with the sulfate, I may modify the end products accordingly. Since I ordinarily treat the calcine in a subsequent step by leaching it with an alkali metal carbonate, such as a sodium carbonate solution, to form soluble sodium aluminate and insoluble calcium carbonate, I prefer to employ such sulfates and metal compounds as will not permit the formation of relatively cheap and undesirable materials during the leaching operation but which give valuable metal sulfates as by-products.

The materials are prepared for the calcination operation in accordance with well known methods, as by grinding to a finely divided condition, and suitably mixing them wet or dry. The mixture may be calcined either in dry form or as a wet slurry at a suitable temperature, such as 1300° C., after which the resulting calcined material may be stored or fed to a granulating device, using water or sodium carbonate solution for the partial extraction of the aluminate. This slurry is then carried to the leaching and decantation system, such as Dorr agitators and thickeners, for the separation of the sodium aluminate solution from the residue, after which aluminum hydroxid may be suitably precipitated therefrom, as by passing carbon dioxide gas through the mass. The residues may be treated as desired to recover valuable ingredients. The hydroxid may be converted to the metal or the oxide form by well known methods.

As an illustration of one method covered by my invention, I may mix silicious bauxite with calcium carbonate in amount equivalent to all the alumina and associated reactive impurities, such as silica, which are present. In order to form the interspersed calcium sulfate, I employ a recoverable sulfate in the form of crude sulfuric acid and an additional amount of calcium carbonate calculated to react with all of the sulfuric acid present. These are preferably so proportioned as to form a considerable amount of interspersed calcium sulfate, which, for example, may approximate 10% of the mass. As an example, I may use the following ingredients in the proportions stated:—

| | Parts by weight |
|---|---|
| Bauxite | 100 |
| Crude $H_2SO_4$ | 14 |
| Lime stone | 80 |

These materials after grinding and mixing are calcined preferably in a rotary kiln in accordance with well known methods at a suitable temperature, which may be around 1300° C., to form calcium aluminate and calcium sulfate of the ingredients. This hot calcine is then subjected in suitable apparatus to the leaching action of an alkali metal carbonate solution, such as potassium or sodium carbonate, thereby converting the aluminate to a soluble alkali metal aluminate and transposing the calcium sulfate to soluble alkali metal sulfate and insoluble calcium carbonate, which may be reused in the process.

The dissolved materials may be separated and treated as desired. I may use the autoprecipitation method for precipitating aluminum hydroxide, but preferably pass carbon dioxide gas collected from the calcination operation into the solution to precipitate the alumina content and reform alkali metal carbonate for further use. The sodium or potassium sulfate may be crystallized out either before or after treatment with $CO_2$ gas. In certain cases, I may treat the solution with barium carbonate to form barium sulfate or blanc fixe, or with other reagents depending on the end products desired.

In order to obtain more desirable end products, I may include in the mixture various metal compounds capable of recovery as sulfates. For example, I may utilize a barium, magnesium or strontium salt capable of reacting with the sulfuric acid and eventually producing an insoluble or soluble sulfate as a valuable end product. In this case, the alkaline earth metal carbonate used to form the aluminate is added only in sufficient amount to take care of the alumina and the impurities in the bauxite or other crude aluminum oxide used, and the other ingredients are employed in equivalent proportions to form the desired interspersed material. By using barium salts, such as barium carbonate, I form barium sulfate interspersed throughout the calcium aluminate, which is not soluble in the sodium carbonate solution and goes with the residue as a valuable end product. If magnesium salts, such as magnesium carbonate, are employed, a soluble magnesium sulfate is formed. Strontium sulfate will be found largely in the residues. Mixtures of raw materials may also be employed, and particularly such minerals, as dolomite, which contain several desired elements.

As an example illustrating the formation of magnesium sulfate by this method, I may employ a mixture of sulfuric acid, lime stone and dolomite containing sufficient alkaline earth metal carbonate to react with all the alumina, silica and iron compounds. and sufficient magnesium carbonate and sulfuric acid to form the desired amount of magnesium sulfate. These ingredients may be proportioned as follows:

| | Parts by weight |
|---|---|
| Bauxite | 100 |
| Dolomite | 16 |
| Sulfuric acid | 14 |
| Lime stone | 80 |

Calcination and subsequent washing with water gives magnesium sulfate in the filtrate, after which the water insoluble calcium aluminate may be converted to sodium aluminate, as above explained.

As an example illustrating the use of a barium salt, I may employ bauxite containing:

| | Per cent by weight |
|---|---|
| Alumina | 60 |
| Silica | 9 |
| Iron oxide | 3 | and mix it with limestone, containing at least 95% of calcium carbonate, witherite or barium carbonate, and waste sulfuric acid as follows:

| | Parts by weight |
|---|---|
| Bauxite | 100 |
| Limestone | 85 |
| Witherite | 10 |
| Sulfuric acid | 10 |

By this method I obtain insoluble barium sulfate, which results in the sulfate radical being removed from the solution as a part of the residue along with calcium silicate and other impurities, when the calcine is treated with the sodium carbonate solution. Precipitation of aluminum hydroxid by carbon dioxid gas serves also to regenerate the sodium carbonate solution for re-use. It of course is understood that the various formulas specified herein must be modified in accordance with the analyses of the original materials, this being a simple matter of chemical mathematics.

As a modification of my method, I may use various metal sulfates or minerals containing the same which are available and may be converted to more valuable materials by my process. These modifications are claimed in my copending application No. 209,397 filed July 29, 1927. I prefer to employ sulfates of the iron and zinc groups, preferably iron, aluminum, zinc and lead, but I may employ chromium, cobalt, nickel and manganese if desired. It is to be understood that the metal sulfates which I may employ exclude those in which the metal is an alkaline earth metal or an alkali metal. The material must be one which will react with the alkaline earth metal carbonate to form a sulfate interspersed throughout the calcine. For example, aluminum sulfate or minerals bearing aluminum sulfate, such as alunite, or the alums, may be incorporated with the alkaline earth metal carbonate and crude aluminum oxide ore. In this case, the alkaline earth metal carbonate, preferably calcium carbonate, is correctly proportioned to form mono-alkaline earth metal aluminate with all of the alumina in the alumina ore and combine with the reactive impurities as well as to provide sufficient alkaline earth to react with all the alumina and the $SO_3$ in the aluminum sulfate to form an aluminate and an alkaline earth metal sulfate therefrom. If barium carbonate is used, an insoluble barium sulfate is formed, this salt remaining undissolved during the leaching operation. The barium compound is preferably added in an amount equivalent to the $SO_3$ present, the alumina of the aluminum sulfate being taken care of by an excess of calcium carbonate over that required by the alumina in the bauxite ore. If other alkaline earth metal carbonates are employed, a soluble metal sulfate, such as magnesium sulfate, is afterwards obtained from the filtrate. For example, I may employ dolomite and limestone for the carbonates with the materials proportioned as follows:

| | Parts by weight |
|---|---|
| Bauxite | 100 |
| Calcium carbonate | 80 |
| Magnesium carbonate | 8 |
| Aluminum sulfate | 10 |

Calcination of this mixture results in the formation of calcium aluminate and magnesium sulfate. The latter along with any other soluble salts may be washed from the calcine by leaching with water, after which the alumina content may be suitably recovered.

As an illustration of my method involving an iron compound, I may employ ferrous sulfate, in which case I use an alkaline earth metal carbonate, such as limestone, in amount equivalent to all of the alumina and the reactive impurities in the bauxite, and I employ an excess of calcium carbonate to combine with the iron, as possibly a ferrate, and combine with the sulfate radical of the iron salt to form calcium sulfate. Here again, insofar as the sulfate radical is concerned one may employ any of the alkaline earth salts to react therewith. As an example, I may use:

| | Parts by weight |
|---|---|
| Bauxite | 100 |
| Calcium carbonate | 90 |
| Ferrous sulfate | 10 |

Calcination of this mixture and subsequent leaching with a soda ash solution forms insoluble calcium carbonate and iron hydroxid and soluble sodium sulfate and aluminate. The sulfate may be thrown out by using a barium compound either in the mixture to be calcined or in a subsequent treatment. If magnesium carbonate or dolomite is used, a soluble magnesium salt is obtained by washing with water, before the step of leaching with the soda ash.

Zinc and lead salts may be similarly employed to furnish the sulfate, or carbonates of these metals combined with other sulfate bearing materials such as sulfuric acid may be used in molecular proportions with the alkaline earth metal carbonate and alumina ore to produce the desired end products.

If other salts, such as chlorides and nitrates, of the alkaline earths and metals are available as cheap raw materials, they may be employed together with a sulfate bearing material, such as sulfuric acid, to provide a metal and a sulfate radical for the reaction. If the acid radical of the salt used is volatile it may be collected and recovered from the furnace gases. Likewise, if soluble salts are formed, they may be crystallized out the same as any soluble metal sulfate which may be produced during the reaction, or they are otherwise suitably separated from the calcined mass.

It should be understood that the reactions which actually take place in practice are probably more complex than as described, but it is immaterial what compounds are formed during calcination so long as the desired end products are obtained. I calculate the proportions of the essential elements for the original mixture to insure sufficient alkaline earth material for substantially completing the reactions and to give such end products as are commercially desirable. I am not limited to any particular amount of alkaline earth metal sulfate, but merely use sufficient sulfate as determined by the analysis of the alumina ore to give an easily leached calcine as well as by the amount of sulfate desired as an end product. By employing a compound containing the sulfate radical which is capable of reacting with the alkaline earth metal compound to form a sulfate of such metal, I provide for the formation of the sulfate during the calcination, and this substance is uniformly interspersed throughout the calcine. Hence there are pores and channels formed during the leaching which permits this operation to proceed substantially to completion.

Having thus described my invention, what I claim as new and desire to secure by Letters Patent is:—

1. The method of treating crude aluminum oxide comprising the steps of mixing the oxide with an alkaline earth material, which is capable of reacting with aluminum oxide to form an aluminate, and with a chemical compound having a non-alkali base and a sulfate radical which is capable of reacting with said material to form an alkaline earth metal sulfate, and calcining the same to form said aluminate and sulfate.

2. The method of treating crude aluminum oxide comprising the steps of providing an alkaline earth metal compound, which is capable of reacting with aluminum oxide to form an aluminate, and a chemical compound having a non-alkali base and a sulfate radical which is capable of reacting with said compound to form an alkaline earth metal sulfate, said alkaline earth metal compound being sufficient in amount to combine with all of the alumina and its associated impurities and with all of the sulfate radical present, and calcining said materials to form alkaline earth metal aluminate having alkaline earth metal sulfate interspersed throughout the calcine.

3. The method of treating an alumina containing material comprising the steps of providing an alkaline earth metal compound and a reagent having a non-alkali base and a sulfate radical which are capable of reacting and are so proportioned as to react during calcination with substantially all of the alumina, as well as the reactable impurities, to form alkaline earth metal aluminate and to provide a considerable amount of alkaline earth metal sulfate, then calcining the mixed materials at a high temperature to cause the formation of a non-vitreous leachable calcine containing said alkaline earth metal aluminate and sulfate, and thereafter leaching the calcine with a solution capable of dissolving the aluminum compound.

4. The method of treating crude aluminum oxide comprising the steps of calcining it with sulfuric acid and with an alkaline earth metal compound capable of reacting therewith to form an aluminate and a sulfate of the alkaline earth metal, and subsequently recovering valuable products from the calcine.

5. The method of treating crude aluminum oxide comprising the steps of calcining the oxide with an alkaline earth metal carbonate, which is capable of reacting with the aluminum oxide to form an aluminate, and with sulfuric acid, said carbonate being sufficient in amount to combine with all of the aluminum oxide to form an aluminate, and with all of the sulfuric acid to form an alkaline earth metal sulfate interspersed throughout the calcine, and subsequently recovering valuable products from the calcine.

6. The method of treating crude aluminum oxide comprising the steps of mixing the oxide with an alkaline earth metal carbonate in a chemically equivalent amount to form a mono-alkaline earth metal aluminate with all of the alumina present, and with sulfuric acid and an alkaline earth metal reagent in equivalent proportions to form an alkaline earth metal sulfate, calcining the mass to form an intimate mixture of alkaline earth metal aluminate and sulfate and subsequently recovering valuable products from the calcine.

7. The method of treating an alumina bearing material comprising the steps of calcining it with a reagent containing the sulfate radical and with an alkaline earth material comprising a magnesium compound which are capable of reacting to form alkaline earth metal aluminate and sulfate, and subsequently recovering magnesium and aluminum compounds from the calcine.

8. The method of treating crude aluminum oxide comprising the steps of calcining the oxide in the presence of sulfuric acid and an alkaline earth material comprising magnesium carbonate which is proportioned to react with all of the oxide and the sulfuric acid during calcination, dissolving any soluble magnesium salts in the calcine by washing with water and recovering the alumina content of the calcine.

9. The method of treating crude aluminum oxide comprising the steps of mixing the oxide in finely divided condition with a calcium compound and a reagent having a non-alkali base and a sulfate radical which are capable of reacting and are proportional to react to form calcium compounds with all of the associated reactive impurities and all of the alumina and sulfate radical present, calcining the mixture to form calcium aluminate and sulfate, and subsequently converting the calcium aluminum compound to a soluble form and recovering the same.

10. The method of treating an alumina bearing material comprising the steps of mixing it with calcium carbonate and sulfuric acid proportioned to form calcium sulfate with said acid and calcium compounds with all of the alumina present and with the associated reactive impurities, calcining the mixture to form said compounds and produce a non-vitreous leachable mass, and subsequently leaching the calcine with a solvent for the calcium aluminum compound.

11. The method of treating crude aluminum oxide comprising the steps of mixing said oxide with calcium and magnesium carbonates and sulfuric acid, calcining the mixture to form alkaline earth aluminate and sulfate and thereafter leaching soluble products from the calcine and recovering the alumina content.

12. The method of treating crude aluminum oxide comprising the steps of mixing the oxide with sulfuric acid and an alkaline earth material, calcining the mixture to form alkaline earth metal aluminate intermixed with a sulfate, and subsequently converting the aluminate to a soluble form and recovering an aluminum compound therefrom.

13. The method of treating crude aluminum oxide comprising the steps of mixing the oxide with sulfuric acid and sufficient alkaline earth metal carbonate to form a mono-alkaline earth metal aluminate with all the alumina present, to react with the associated impurities and to form a sulfate by reaction with the sulfuric acid, thereafter calcining the mixture to form said aluminate with a sulfate interspersed throughout the mass, and subsequently recovering the alumina content from the calcine.

14. The method of treating crude aluminum oxide comprising the steps of mixing the oxide with sulfuric acid and sufficient calcium and magnesium carbonates to form calcium aluminate with all the alumina present, and alkaline earth metal compounds with the sulfate and the associated reactive impurities, calcining said materials to form an intimate mixture of alkaline earth metal aluminate and sulfate, washing the soluble magnesium salts from the calcine, and subsequently recovering an aluminum compound from the residue.

15. The method of treating crude aluminum oxide comprising the step of calcining the oxide in the presence of alkaline earth metal carbonate and sulfuric acid, the added ingredients being used in such amounts that an aluminate is formed with substantially all of the alumina present and at least 10% of the calcine consists of alkaline earth metal sulfate interspersed throughout the product.

Signed at New York city, this 28th day of August 1922.

THOMAS AUSTIN MITCHELL.